3-290 CROSS REFERENCE SEARCH ROOM

Sept. 18, 1956 W. H. HENRICH 2,763,852

TELEMETERING SYSTEMS

Filed Oct. 15, 1952 3 Sheets-Sheet 1

INVENTOR.
William H. Henrich

Sept. 18, 1956 W. H. HENRICH 2,763,852

TELEMETERING SYSTEMS

Filed Oct. 15, 1952 3 Sheets-Sheet 2

INVENTOR.

William H. Henrich

TELEMETERING SYSTEMS
Filed Oct. 15, 1952 3 Sheets-Sheet 3
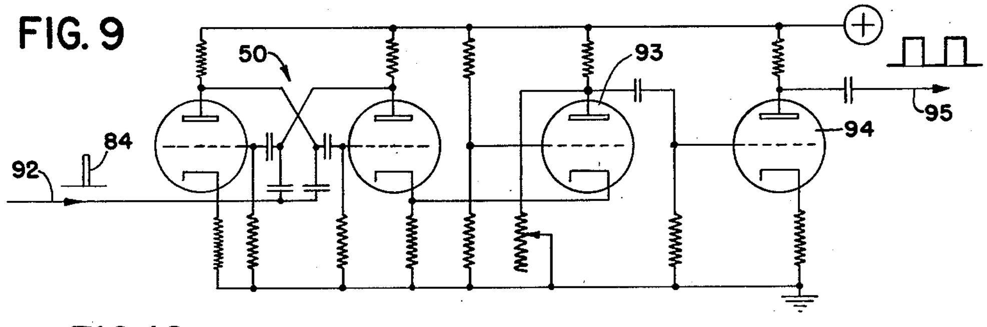
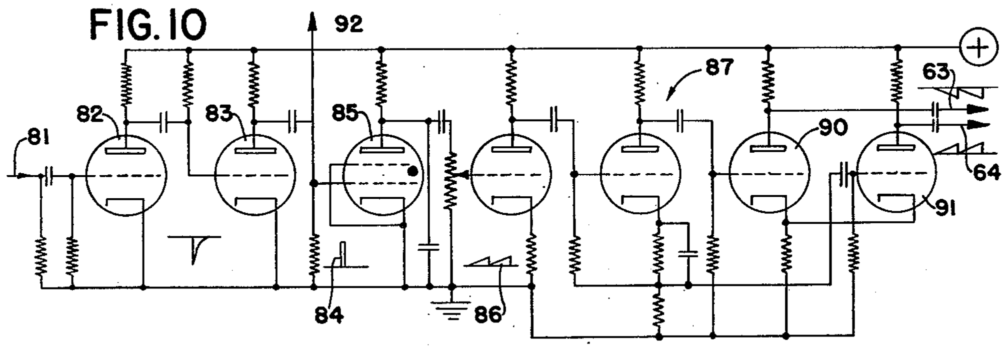
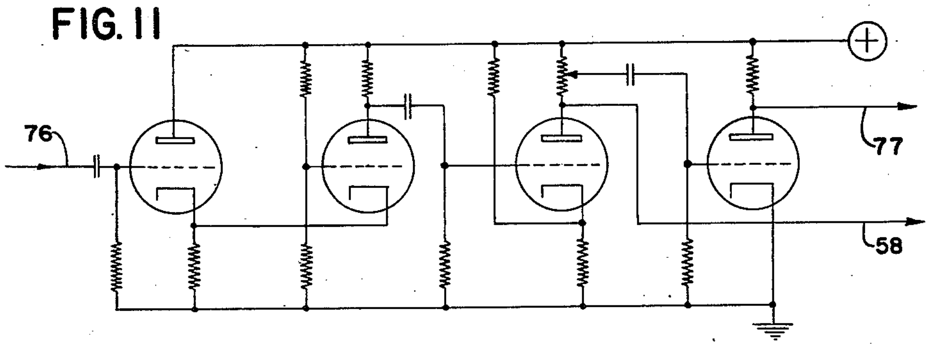
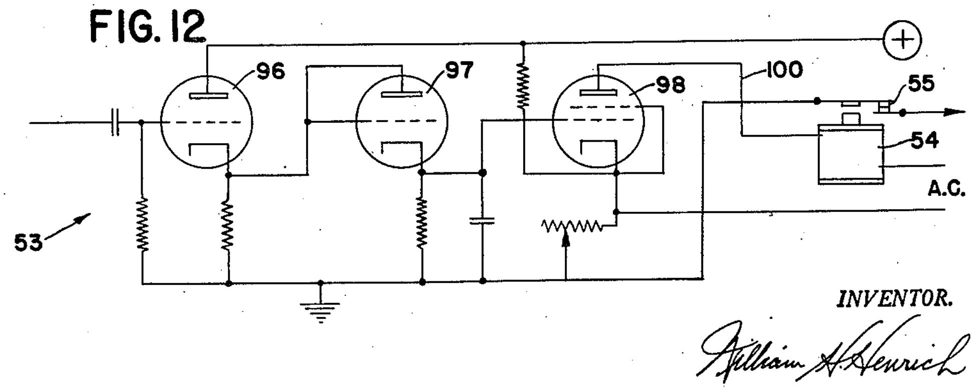
INVENTOR.
William H. Henrich

United States Patent Office 2,763,852

Patented Sept. 18, 1956

2,763,852

TELEMETERING SYSTEMS

William H. Henrich, East Norwalk, Conn.

Application October 15, 1952, Serial No. 314,894

5 Claims. (Cl. 340—190)

This invention relates to a telemetering system for showing the position of a measuring instrument or gauge at a remote position on a fluorescent screen. It has particular reference to a telemetering system which senses the position of an indicating mechanism, moving in one dimension only, and transfers the sensed information to the fluorescent screen of a cathode ray tube, showing the information in two dimensions.

Transfer of metered information or information which is derived from the position of indicators has been accomplished by television systems, using a camera focused on the meter and employing a standard television receiving set for receiving the information at one or more remote positions. Such a system is obviously expensive, bulky, and hard to maintain, and in addition requires the use of many stabilized voltages and frequencies. In addition the usual television cameras require the use of considerable lighting in order to transmit proper images.

One of the objects of this invention is to provide an improved telemetering system which avoids one or more of the disadvantages and limitations of prior art arrangements.

Another object of the invention is to reduce the cost of telemetering systems.

Another object of the invention is to provide a telemetering system which senses the position of an indicating device by light means only.

Another object of the invention is to provide a telemetering system which requires no additional illumination other than that normally used to read the indicating device.

Another object of the invention is to enable the sensing system of a telemetering device to discriminate between colors.

The invention includes an optical system which produces an image of a vertical gauge or instrument upon a mechanical scanning device which may be a rotating wheel containing slots. Behind the wheel a photoelectric cell is mounted so as to pick up the light rays focused by the optical system. The output of the photoelectric cell is amplified and transformed by clipping and wave shaping circuits and is then applied to the horizontal deflection system of a cathode ray tube to produce a horizontal shift of a focused cathode ray beam. The scanning device and the voltage applied to the vertical deflection system are synchronized with each other.

Another feature of the invention includes an optical filtering device which permits the photoelectric cell to be actuated by light having certain color characteristics, thereby differentiating between two colors reflected from or transmitted by the instrument.

For a better understanding of the present invention, together with other and further objects thereof, reference is made to the following description taken in connection with the accompanying drawings.

Fig. 9 is a schematic diagram of connections of a multivibrator and amplifier used when a double image is being shown.

Fig. 10 is a schematic diagram of connections, shown in block form in Fig. 1, for producing synchronized sweep voltages for the vertical deflection system of the cathode ray tube.

Fig. 11 is a schematic diagram of connections for producing discrete voltage pulses for producing the cathode ray trace shown in Fig. 4.

Fig. 12 is a schematic diagram of connections of a protective circuit which causes the cathode ray tube to become inoperative whenever no signal is received by the display tube.

Figures 1, 2, 2A, 3, 4, 5:
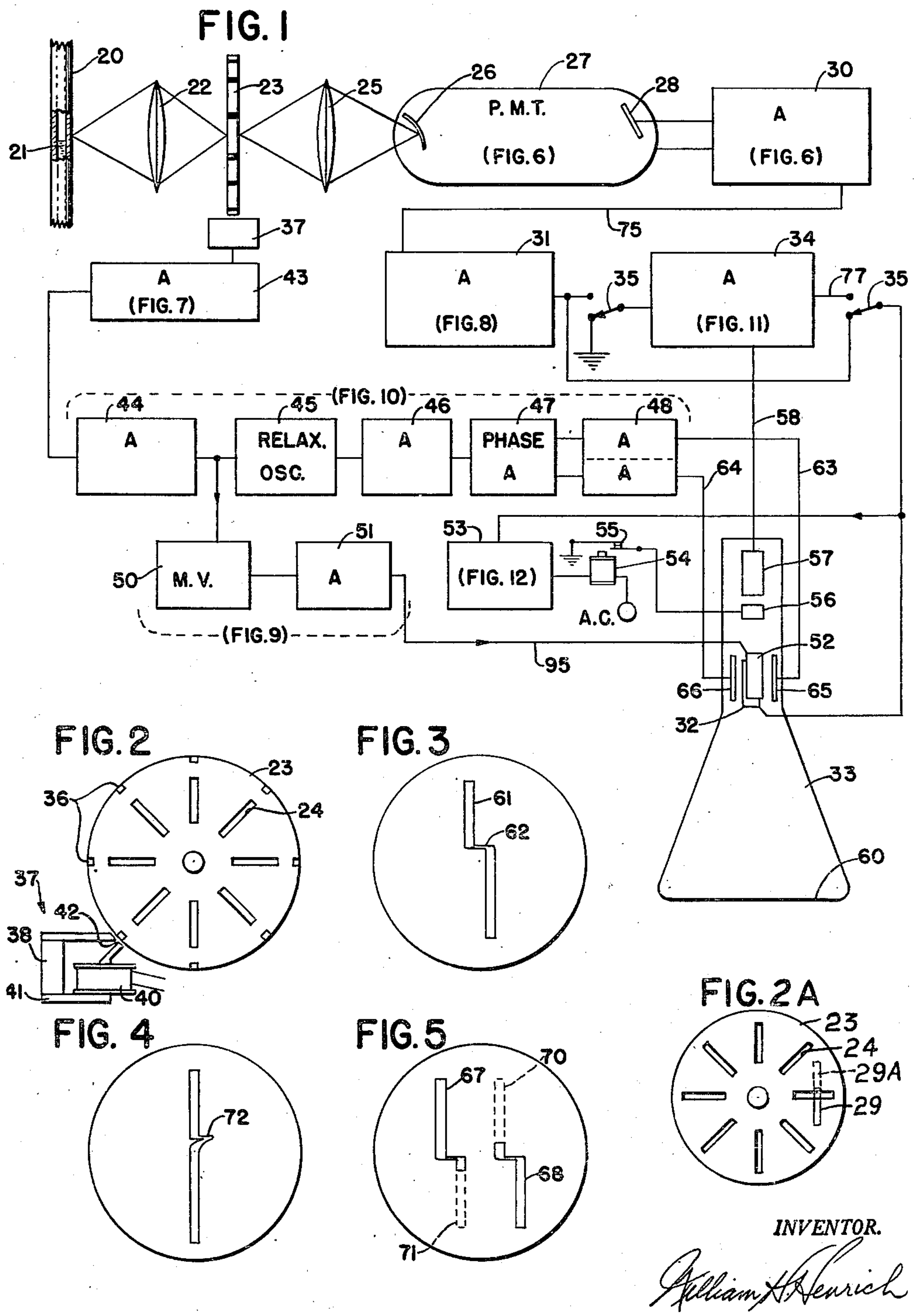
Fig. 1 is a block diagram showing the entire system.
Fig. 2 is a detailed showing of the front view of the scanning wheel.
Fig. 2A is a front view of the scanning wheel showing the image of the gauge focussed thereon.
Fig. 3 is an end view of a cathode ray tube showing the method of indicating telemetered information.
Fig. 4 is the same as Fig. 3 but showing an alternate arrangement of the received information.
Fig. 5 is an end view of a cathode ray tube showing two traces on the cathode ray screen from two sources of information.

Referring now to Fig. 1, a gauge 20 is shown mounted in a vertical position and having an indicating column of water 21 in the lower section of the tube. This gauge may include colored water for its indicating column or it may possess an optical system which shows one color above the meniscus and another color below the meniscus, such indicating devices being old in the art. An optical system 22 focuses the image of the indicating device on a rotating scanning wheel 23, the details of which are shown in Fig. 2 and Fig. 2A. Scanning wheel 23 contains a plurality of slots cut in the wheel for passage of light rays from the indicating device 20. A second optical system 25 collects the light passing through the scanning wheel 23 and focuses it on a cathode 26 of a photomultiplier tube 27. Optical system 25 is not always necessary, and the photoelectric tube 27 may be placed in close proximity to the scanning wheel 23. Fig. 2A shows the image of the gauge focussed on the scanning wheel 23. In this figure the wheel turns in a clockwise direction and the slots 24 first scan the top portion 29A of the image. Next, the bottom portion 29 is scanned and light is transmitted from the bottom through the slot and lens 25 to the first cathode 26 in tube 27.

The photo-multiplier tube 27 contains a number of secondary emissive electrodes and an anode 28 which are supplied with voltages which are necessary for tube operation. The output of multiplier tube 27 is applied to an amplifier circuit 30 which amplifies the pulses received from tube 27 and applies them to a second amplifier and clipping circuit 31. The output of this circuit may be applied directly to the right hand deflection plate 32 of a cathode ray tube 33. When an alternate system of display is used to show the trace illustrated in Fig. 4, an additional amplifier circuit 34 is switched into the circuit by means of a switch 35.

Synchronization of the vertical trace on the cathode ray tube and the rotation of the scanning wheel 23 may be accomplished in several ways. For example, a controlling oscillator circuit may be employed to produce both the deflection voltage for the cathode ray beam and also the alternating power which can be used by a transducer to operate the scanning device. The synchronizing system shown in Figs. 1 and 2 includes the use of small iron inserts 36 set in the periphery of a nonferromagnetic scanning wheel 23. A magnetic sensing device 37 includes a permanent magnet 38, a coil 40, and a magnetic core 41 of soft iron which is terminated by an air gap 42, positioned close to the edge of the wheel, thereby sensing the passage of inserts 36. The pulses generated in coil 40 are transmitted to an amplifier 43 and applied to a second amplifier 44, which shapes the amplified pulse and delivers magnified narrow pulse to a relaxation oscillator 45 which generates a positive saw-tooth wave. The output from this circuit is again amplified by amplifiers 46, 47, and 48, thereby producing both a positive and a negative saw-tooth wave which are applied to the vertical deflection plates of cathode ray tube 33. These saw-tooth waves produce the vertical deflection of the cathode ray beam regardless of the position of the indicator device.

A multivibrator circuit 50 is connected to the conductor which joins circuits 44 and 45 and produces a square-top wave which is amplified by circuit 51 and is then applied to the left hand horizontal deflection plate 52. This circuit is in operation at all times, but a control is available for controlling the input to one of the stages so that its output may be reduced to zero. The circuit is used only when a double trace, such as indicated in Fig. 5, is desired.

A protective circuit 53 is connected to the output conductor which is connected to switch arm 35 and carries the signal which contains the information regarding the position of the water in the gauge. As long as this signal is present, a relay winding 54 will receive current and will hold down relay contacts 55, thereby connecting an anode 56 in the picture tube to ground. The cathode 57 in the picture tube is connected by means of conductor 58 to part of the circuit 34. If the signal should for any reason be absent on the conductor which leads to deflection plate 32, relay contacts 55 will open and no picture will be shown on fluorescent screen 60.

The operation of this circuit is as follows: Light from the gauge 20 is focused on the scanning wheel 23, forming a vertical image on one of its surfaces. As the wheel turns, light from the top of the column passes through one of the slots 24 in the wheel and then, after a certain time interval, the meniscus image and the light which is transmitted by the bottom of the column is transmitted to the photo-multiplier tube 27. Provision is made for causing the light transmitted through the gauge to possess different characteristics above and below the meniscus. One well known way of distinguishing between the two parts of the indicating column is to transmit green light through the upper portion and red light through the lower portion. Another arrangement includes a device which transmits light through the water column 21 while permitting the space above the water to remain dark. When colors are used, a colored mask or filter is placed anywhere in the optical system, thereby permitting light to reach the photo cell only when the bottom portion of the water column is being scanned. This arrangement produces a signal which varies in time in accordance with the height of the indicating column.

Figure 6:
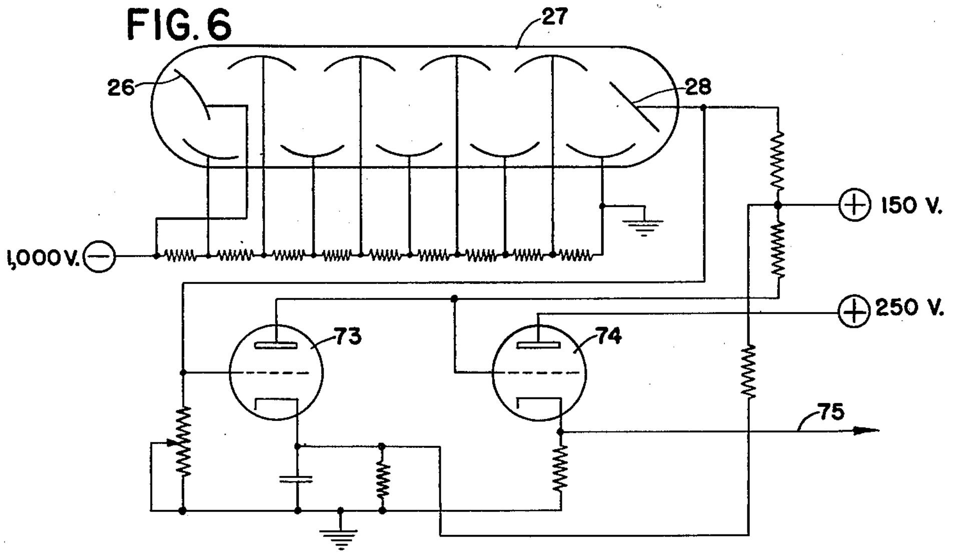
Fig. 6 is a schematic diagram of connections of a photomultiplier cell and an amplifier circuit.
Figure 7:
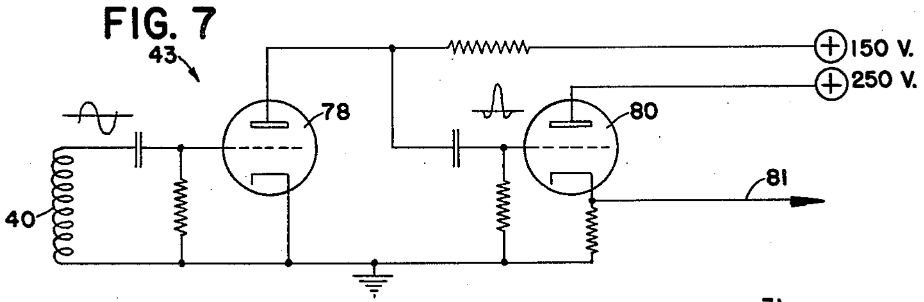
Fig. 7 is a schematic diagram of connections of a circuit which obtains a synchronizing signal from a rotating scanning wheel having magnetic inserts.
Figure 8:
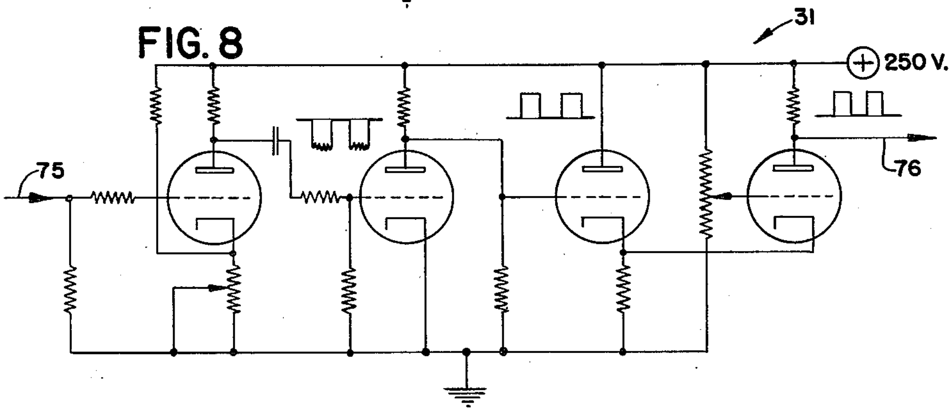
Fig. 8 is one of the sections shown in block in Fig. 1 for amplifying and clipping the signal which is obtained from the photoelectric cell.

Amplifiers 30, 31, and 34, shown in detail in Figs. 6, 8, and 11, amplify the information signal and produce sufficient voltage at the output terminal so that, when applied to deflection plate 32, the signal shifts a vertical trace 61, such as shown in Fig. 3, to the right. The horizontal line 62, shown in Fig. 3, will show the relative position of the top of the indicating column provided the phase of the horizontal deflection voltage is maintained in correct relationship to the vertical deflection voltage. In order to assure that such a relationship is maintained, the inserts 36 are secured to the periphery of the scanning wheel, and their presence is sensed by the pickup arrangement 37 shown in Fig. 2. This signal is applied to an amplifier 43, shown in detail in Fig. 7. The amplified signal from this circuit is applied to another amplifier 44, the output of which is used to control the frequency of a relaxation oscillator circuit 45. This circuit produces a single saw-tooth wave which, when amplified and divided in phase, is applied over conductors 63 and 64 to vertical deflection plates 65 and 66. These voltage waves produce the vertical trace shown in Figs. 3, 4, and 5.

Some installations of water gauges use two gauges in parallel connection mounted in vertical alignment with each other but at different heights. In order to show a picture on the screen which correctly represents these two gauges, a multivibrator circuit 50 and its associated amplifier 51 are employed to shift the cathode ray beam every second trace to a second position. The result of this additional deflection voltage is shown in Fig. 5 where two traces 67 and 68 are shown side by side to represent the approximate positions of the gauges on the boiler. Two masks are used to block off portions 70 and 71 to make the representation more nearly conform to the scanned gauges. The flat topped pulse which shifts the vertical trace from one position to another is formed in circuit 34 which may be switched into the picture tube circuit by switch arms 35.

There may be times when the patterns shown in Fig. 3 and Fig. 5 are undesirable and instead a single vertical trace with a small pulse tip 72, as shown in Fig. 4 will give a better indication of the gauge height. To obtain such a picture, switch arms 35 are moved to the position shown in Fig. 1, and the output from circuit 31 will be applied directly to deflection plate 32.

Referring now to Fig. 6, the photo-multiplier tube 27 is shown in detail and includes a cathode 26, an anode 28, and nine intermediate electrodes designed for secondary emission. The cathode is maintained at a negative voltage of 1,000 volts, the ninth secondary emission electrode is grounded and the anode is connected through an output resistor to 150 volts positive potential. Intermediate voltages for the eight remaining electrodes are obtained from a voltage divider comprising nine resistors in series. Anode 28 is connected directly to the control electrode of an amplifier tube 73, and the anode of this tube is connected to the control electrode of a second amplifier tube 74. This tube is arranged as a cathode follower, and the output voltage is delivered over conductor 75 to an amplifier-clipper circuit shown in detail in Fig. 8.

The amplifier shown in Fig. 8 is employed mainly for clipping the crests and troughs of the received wave so that the edges of the trace on the picture tube will not be burred. It should be pointed out here that the information carried by this wave is characterized by the length of the pulse in time duration, rather than its potential. The output of amplifier 31 is delivered over conductor 76 and is next applied, when switch arms 35 are in the upper position, to amplifier circuit 34. The details of this circuit are shown in Fig. 11. The circuit includes four tubes and their associated circuits to produce a strong output pulse over conductor 77. A second output circuit is connected to one of the intermediate tubes and is connected to the electron gun 57 by means of conductor 58.

The pickup pulse generated in circuit 37 is applied to amplifier 43, shown in detail in Fig. 7. The input to this circuit resembles a sine wave, and this is first shaped by a biased amplifier triode 78 and then clipped by a second triode 80 so that output conductor 81 transmits a sharp, positive pulse to a series of wave shaping and amplifying circuits 44 to 48, shown in detail in Fig. 10. The first two amplifier stages 82 and 83 continue the forming action on the synchronizing pulse until it consists of a sharp, thin pulse shown at 84. This pulse is applied to a gas-filled tetrode 85, which is connected as a relaxation oscillator. The output of this circuit is the well known saw-tooth wave shown at 86. The amplified saw-tooth wave could be applied directly to a picture display tube if the power of the output circuit and the sensitivity of the receiving tube were sufficient to produce a complete trace over the entire tube face. In order to insure that enough voltage would be available, a phase splitting circuit 87 is employed, and the two outputs resulting from this circuit are applied to triodes 90 and 91 to produce a positive saw-tooth wave over conductor 64 and a negative saw-tooth wave over conductor 63. These conductors are connected directly to deflection plates 65 and 66.

The control pulse 84, which was generated by amplifier triode 83 is also applied over conductor 92 to a multivibrator circuit shown in detail in Fig. 9. The multivibrator circuit, as is well known, produces a square-top wave of half the frequency as the control wave. The output of the multivibrator is amplified by triodes 93 and 94 and sent over conductor 95 to plate 52 in the display tube and shifts the cathode beam every second trace to show two images instead of one.

The protective circuit 53 is shown in detail in Fig. 12 and comprises an amplifier tube 96, a rectifier tube 97, and a tetrode 98. When a signal is supplied to deflection plate 32, a voltage is received on the input conductor of circuit 53, and a large current is produced in the anode conductor 100 which leads to relay winding 54 and an independent alternating current supply which is isolated by a transformer so there is no direct connection between this supply line and the normal direct current power supply system. The current in coil 54 holds the contacts 55 closed and thereby connects anode 56 in the picture tube to ground. As soon as the input signal from amplifier 31 or 34 is reduced to zero, contacts 55 will open and the display tube will show no trace of any kind on fluorescent screen 60.

Fig. 1 shows a single scanning means connected to a single cathode ray tube. It will be obvious that several cathode ray display tubes may be connected to a single scanning means and that the display tubes can be positioned at points remote to each other. The placing of the amplifying equipment is optional but it has been found convenient to mount circuits 37, 43, and 30 at or near the scanning device and the remainder of the equipment mounted in the box which holds the display tube.

From the foregoing description it will be evident that a novel telemetering system has been devised and can be employed for the accurate reproduction at distant points of an indicating instrument.

While there have been described and illustrated specific embodiments of the invention, it will be obvious that various changes and modifications may be made therein without departing from the field of the invention which should be limited only by the scope of the appended claims.

I claim:

1. A telemetering system for showing the position of a linear indicating device at a remote station comprising, an optical system for producing an image of the indicating device, a rotary scanning wheel mounted in the image plane of the optical system which transmits successive portions of the image through a moving slot, said scanning wheel including discrete magnetic elements which cooperate with a stationary magnetic pick-up device for producing synchronous electrical pulses, a photosensitive device mounted adjacent to the scanning device which receives said transmitted image portions and produces electrical signals whose time duration is proportional to the received light values, a cathode ray receiving tube having horizontal and vertical deflection means, said vertical deflection means controlled by said synchronous electrical pulses, and an amplifier coupled between said photosensitive device and the horizontal deflection means.

2. A telemetering system in accordance with claim 1 wherein said rotary scanning wheel scans the image in one dimension only.

3. A telemetering system in accordance with claim 1 wherein said electrical signals produced by the photosensitive device constitute voltage pulses, the time duration of which are proportional to the relative position of a movable element in the linear indicating device.

4. A telemetering system in accordance with claim 1 wherein said vertical deflection means is operated by a series of voltage sweep pulses, the phase of which is controlled by the synchronous electrical pulses.

5. A telemetering system in accordance with claim 4 wherein said vertical deflection means produces a vertical trace on the cathode ray tube which is independent of the position of a movable element in the linear indicating device.

References Cited in the file of this patent

UNITED STATES PATENTS

| | | |
|---|---|---|
| 2,110,746 | Tolson | Mar. 8, 1938 |
| 2,412,350 | Morgan | Dec. 10, 1946 |
| 2,491,591 | Sweeny et al. | Dec. 20, 1949 |
| 2,573,006 | Good | Oct. 30, 1951 |
| 2,609,143 | Stibitz | Sept. 2. 1952 |
| 2,656,407 | Herrick et al. | Oct. 20, 1953 |